3,375,173
FERMENTATION PROCESS FOR THE PRODUCTION OF L-THREONINE
Sukeji Nishimura, Tokyo, Yutaka Sugawara, Higashi-Murayama-shi, Tokyo, and Takeshi Nozaki, Tokyo, Japan, assignors to Chugai Seiyaku Kabushiki Kaisha, Chuo-ku, Tokyo, Japan, a corporation of Japan
No Drawing. Filed June 22, 1965, Ser. No. 466,103
Claims priority, application Japan, July 1, 1964, 39/37,014
8 Claims. (Cl. 195—29)

ABSTRACT OF THE DISCLOSURE

A process for preparing L-threonine useful in the synthesis of peptides by cultivating a bacteria of the genus Proteus under submerged aerobic conditions in an aqueous nutrient medium. The medium contains homoserine unless isoleucine requiring mutants of Proteus are cultivated in which case the medium must contain isoleucine or α-aminobutyric acid.

---

This invention relates to a fermentation process for the production of L-threonine and more particularly to the production of L-threonine by the cultivation of bacteria of the genus Proteus.

L-threonine is an essential amino acid which is useful in human nutrition studies and also in the synthesis of peptides which is of considerable biological interest.

As to the fact that L-threonine is accumulated by the cultivation of a microorganism, a number of reports have been made, for example, the accumulation of L-threonine by cultivating *Bacillus subtilis* or *Xanthomonas citri* in a medium containing homoserine and by cultivating α-diaminopimelic acid and methionine requiring mutant of *Escherichia coli* or methionine and lysine requiring mutant of *Micrococcus glutamicus*. It has now been found that appreciable amounts of L-threonine may be accumulated by cultivating bacteria of the genus Proteus such as *P. rettgeri, P. vulgaris*, in a medium containing homoserine or cultivating an auxotrophic mutant of said bacteria, which requires isoleucine or α-aminobutylic acid for growth in a medium containing an adequate amount of one of said requiring substances in the presence or absence of homoserine. Above all, the method using isoleucine requiring mutant of a microorganism which has not been reported is economical and practical, therefore such method is amenable to large scale commercial production.

Briefly, the process of this invention comprises cultivating, under submerged aerobic condition, at a temperature from 28 to 37° C. and at a pH of from about 6 to about 8, bacteria of the genus Proteus in a nutrient medium containing carbon source, nitrogen source inorganic salts and other nutrients for bacteria in the presence or absence of homoserine and isolating L-threonine accumulated in the fermentation broth.

The bacteria used in the present invention are known bacteria belonging to the genus Proteus such as *Proteus rettgeri, Proteus vulgaris* or isoleucine requiring mutant of said microorganism obtained by ultraviolet treatment and selection from a wild strain of said bacteria with penicillin.

In carrying out the process of this invention the medium must contain homoserine as a precursor of L-threonine in case of using the wild type strain of bacteria such as *Proteus rettgeri* and *Proteus vulgaris*. And in the case of using isoleucine-requiring mutant, an adequate amount of isoleucine or α-amino-butyric acid must be contained in a nutrient medium, preferably from about 80 to about 230 γ/ml.

In the latter case, the addition of homoserine is nonessential, but the addition of homoserine surprisingly increases the yield of L-threonine. As isoleucine, the organic substance containing isoleucine such as corn steep liquor, meat extract, pepton, yeast extract casein hydrolysate and the like may also be used.

As homoserine, either D,L-homoserine or L-homoserine may be used. From 1.0 to 6.0% by weight in case of using D,L-homoserine and from 0.5 to 3.0% by weight in case of using L-homoserine are preferable, and either of them is advantageously added at the first stage of cultivation. The nutrient medium to be used in the invention may be composed of the useful ingredients conventionally used for the fermentation of microorganisms. For example, it is preferable to use glucose, or glycerol as the carbon source, and as the nitrogen source, organic nitrogen source such as corn steep liquor, meat extract, pepton and yeast extract or inorganic nitrogen source such as ammonium sulfate, ammonium chloride, ammonium nitrate, urea and ammonium phosphate. Especially combination of corn steep liquor and ammonium sulfate or ammonium phosphate gives a good result. As inorganic salts, monopotassium phosphate, dipotassium phosphate, magnesium sulfate and the like may be used. And for the purpose of controlling the pH of the medium during fermentation, calcium carbonate may be advantageously added to the medium.

In carrying out the fermentation, submerged culture with aeration is suitable, although shaking or stationary culture may also be employed. In any case, the culture is carried out at a temperature of 28 to 37° C., preferably at 30° C.

The fermentation is continued until the accumulation of L-threonine in the medium reaches to the maximum generally for 2 to 4 days.

After the fermentation is completed, L-threonine may be readily isolated with conventional procedures from the fermentation broth. For example, after filtration or centrifugation of the fermentation broth, L-threonine is isolated from the filtrate or the supernatant by ion exchange resin treatment.

The following examples which are intended as informative and typical only and not in a limiting sense will further illustrate the invention.

EXAMPLE 1

After culture medium containing 5.0% of glucose, 0.5% of ammonium sulfate, 0.5% of corn steep liquor, 0.6% of D,L-homoserine, 0.08% of dipotassium phosphate, 0.04% of magnesium sulfate and 0.005% of ferric chloride was sterilized, calcium carbonate which had been dry-heat sterilized separately was so added as to become 2%.

*Proteus rettgeri* was inoculated into said culture medium and cultivated under shaking at a temperature of 30° C. for 72 hours to give a fermentation broth containing 1.3 mg./ml. of L-threonine (bioassay value with *Streptococcus faecalis R*). 500 ml. of the fermentation broth was subjected to centrifuge to remove the bacterial cells and adsorbed on ion exchange resin Dowex 50 WX 8 (H type, Trade Mark). After washing with water, L-threonine fraction was eluted with 0.25 N ammonia water from the ion exchange resin. The L-threonine fraction was concentrated and 580 mg. of crude L-threonine crystals were obtained by the addition of ethanol.

EXAMPLE 2

*Proteus vulgaris* was inoculated into the same culture medium as in Example 1 and cultivated under shaking at a temperature of 30° C. for 72 hours to give a fermentation broth containing 1.1 mg./ml. of L-threonine (bioassay value with *Streptococcus faecalis R*). The fermentation proth was subjected to the same treatment as in Example 1.

EXAMPLE 3

Isoleucine requiring mutant of *Proteus rettgeri* was inoculated into a culture medium containing 10.0% of glucose, 2.0% of ammonium sulfate, 0.1% of dipotassium, phosphate, 0.03% of magnesium sulfate, 2.0% of calcium carbonate and 200 γ/ml. of L-isoleucine and cultivated under shaking at a temperature of 30° C. for 4 days to give a fermentation broth containing 2.7 mg./ml. of L-threonine (bioassay value with *Streptococcus faecalis R*). 500 ml. of the fermentation broth was subjected to the same treatment as in Example 1 to give 1.0 g. of crude L-threonine crystals.

EXAMPLE 4

Isoleucine requiring mutant of *Proteus rettgeri* was inoculated into a culture medium containing D,L-α-aminobutyric acid instead of L-isoleucine in the culture medium of Example 3 and cultivated under shaking at a temperature of 30° C. for 3 days to give a fermentation broth containing 1.1 mg./ml. of L-threonine (bioassay value with *Streptococcus faecalis R*).

EXAMPLE 5

Isoleucine requiring mutant of *Proteus rettgeri* was inoculated into a cultural medium containing 5.0% of glucose, 0.1% of dipotassium phosphate, 2.0% of ammonium sulfate, 0.03% of magnesium sulfate, 3.0% of calcium carbonate, 1.5% of corn steep liquor and 4.0% of D,L-homoserine and cultivated under shaking at a temperature of 30° C. for 4 days to give a fermentation broth containing 17.8 mg./ml. of L-threonine (bioassay value with *Streptococcus faecalis R*). 500 ml. of the fermentation broth was subjected to the same treatment as in Example 1 to give 1.5 g. of crude L-threonine crystals.

What is claimed is:

1. A process for the production of L-threonine which comprises cultivating bacteria of the genus Proteus under submerged aerobic conditions in a suitable aqueous nutrient medium containing homoserine.
2. A process according to claim 1, wherein said nutrient medium contains from about 1.0 to about 6.0% by weight of homoserine.
3. A process according to claim 1, wherein said bacteria are selected from the group consisting of *Proteus rettgeri* and *Proteus vulgaris*.
4. A process according to claim 1, wherein said nutrient medium contains from about 1.0 to about 6.0% by weight of homoserine.
5. A process according to claim 3, wherein said bacteria are cultivated at a temperature from 28 to 37° C. and at a pH from 6 to 8.
6. A process for the production of L-threonine which comprises cultivating isoleucine requiring mutants of bacteria of the genus Proteus under submerged aerobic conditions in a suitable aqueous nutrient medium containing an amino acid selected from the group consisting of isoleucine and α-amino butyric acid.
7. A process according to claim 6, wherein said nutrient medium contains from about 80 to about 230 γ/ml. of said amino acid per milliliter of nutrient medium.
8. A process according to claim 6, wherein said bacteria is an isoleucine requiring mutant of *Proteus rettgeri*.

References Cited

UNITED STATES PATENTS 3,099,604   7/1963   Kinoshita et al. _____ 195—29

LIONEL M. SHAPIRO, *Primary Examiner.*